US010442536B2

(12) United States Patent
Vervaet et al.

(10) Patent No.: US 10,442,536 B2
(45) Date of Patent: Oct. 15, 2019

(54) MODULAR LAVATORY ASSEMBLY FOR A VEHICLE CABIN, CABIN OF A VEHICLE AND AIRCRAFT HAVING A CABIN AND AT LEAST ONE MODULAR LAVATORY ARRANGEMENT

(71) Applicant: Airbus Operations GmbH, Hamburg (DE)

(72) Inventors: Martijn Vervaet, Hamburg (DE); Torben Hennig, Hamburg (DE); Michael Lau, Hamburg (DE); Julia Rotenberger, Hamburg (DE)

(73) Assignee: Airbus Operations GmbH (DE)

( * ) Notice: Subject to any disclaimer, the term of this patent is extended or adjusted under 35 U.S.C. 154(b) by 405 days.

(21) Appl. No.: 15/334,823

(22) Filed: Oct. 26, 2016

(65) Prior Publication Data
US 2017/0043875 A1    Feb. 16, 2017

Related U.S. Application Data

(63) Continuation of application No. PCT/EP2015/059200, filed on Apr. 28, 2015.

(30) Foreign Application Priority Data

Apr. 28, 2014 (EP) .................................... 14166249

(51) Int. Cl.
*B64D 11/02* (2006.01)
*A47K 4/00* (2006.01)
*B64D 11/00* (2006.01)

(52) U.S. Cl.
CPC ................ *B64D 11/02* (2013.01); *A47K 4/00* (2013.01); *B64D 2011/0046* (2013.01); *Y02T 50/46* (2013.01)

(58) Field of Classification Search
CPC .... B64D 11/02; B64D 2011/0046; A47K 4/00
See application file for complete search history.

(56) References Cited

U.S. PATENT DOCUMENTS

| 5,150,863 A | 9/1992 | Hozumi |
| 8,662,444 B2 | 3/2014 | Tappe et al. |

(Continued)

FOREIGN PATENT DOCUMENTS

| DE | 94 12 157 U1 | 9/1994 |
| DE | 20 2009 004485 U1 | 6/2009 |

(Continued)

OTHER PUBLICATIONS

Extended European Search Report (EP 14 166 249.4) dated May 12, 2014.

(Continued)

*Primary Examiner* — Nicholas McFall
(74) *Attorney, Agent, or Firm* — Lerner, David, Littenberg, Krumholz & Mentlik, LLP

(57) ABSTRACT

A modular lavatory assembly for a vehicle cabin includes a lavatory module having a housing and a toilet system having a toilet arranged in an inner space of the lavatory module and at least one service module having at least one service unit for personal use by a passenger. The at least one service module is attached to an outside of the housing. The housing encloses an inner space, which is free from additional service modules and includes at least one recess for accessing the at least one service unit of the at least one service module from an inside of the housing with the at least one service module being configured for providing access through the at least one recess. The at least one service module includes at least one additional access for accessing the at least one service unit from outside the housing.

11 Claims, 4 Drawing Sheets

(56) References Cited

U.S. PATENT DOCUMENTS

| | | | | |
|---|---|---|---|---|
| 8,998,136 B2* | 4/2015 | Wilkinson | ............. | B64D 11/04 |
| | | | | 244/118.1 |
| 2004/0163170 A1* | 8/2004 | Cooper | ................. | B64D 11/02 |
| | | | | 4/664 |
| 2005/0230539 A1* | 10/2005 | Quan | .................... | B64D 11/02 |
| | | | | 244/118.1 |
| 2011/0253835 A1 | 10/2011 | Cook et al. | | |
| 2014/0332629 A1* | 11/2014 | Hashberger | ............ | B64D 11/00 |
| | | | | 244/118.6 |
| 2015/0284085 A1* | 10/2015 | McKee | ................. | B64D 11/02 |
| | | | | 244/118.5 |

FOREIGN PATENT DOCUMENTS

| | | |
|---|---|---|
| DE | 10 2009 034 406 A1 | 2/2011 |
| WO | 2013171077 A1 | 11/2013 |

OTHER PUBLICATIONS

International Search Report and Written Opinion PCT/EP2015/059200 (dated Jul. 21, 2015).

\* cited by examiner

MODULAR LAVATORY ASSEMBLY FOR A VEHICLE CABIN, CABIN OF A VEHICLE AND AIRCRAFT HAVING A CABIN AND AT LEAST ONE MODULAR LAVATORY ARRANGEMENT

CROSS-REFERENCE TO RELATED APPLICATIONS

This application is a continuation of International Application No. PCT/EP2015/059200, filed Apr. 28, 2015, published in English, which claims priority from European Patent Application No. 14166249.4, filed Apr. 28, 2014, all of which are incorporated herein by reference.

FIELD OF THE INVENTION

The invention relates to a modular lavatory assembly for a vehicle cabin, to a cabin of a vehicle as well as to an aircraft having a cabin and at least one modular lavatory arrangement.

BACKGROUND OF THE INVENTION

Commonly, lavatory assemblies for a cabin of a vehicle comprise a housing, which has a self-supporting body that encloses a toilet system and several service units for providing all necessary amenities for a passenger. These may include a washbasin, a waste bin, a cosmetic cabinet, towel dispensers and others. Often, these lavatory assemblies are customized through individual arrangement of the service units inside the housing, positioning and aligning the toilet and by adjusting the shape of the housing. However, a customized redesign of the lavatory assembly is cumbersome and disadvantageous under an economical view if it is an individual solution for only a low number of vehicles.

WO 2013171077 A1 discloses an aircraft lavatory comprising a compact urinal unit extending from a sanitary wall section into a cabin interior space.

DE 10 2009 034 406 A1 shows an aircraft lavatory having both a toilet and a urinal, wherein the associated lavatory cabin may be expanded or shrunk depending on the specific application, such that in the expanded state enough space for both toilet and urinal is provided.

The aircraft lavatory disclosed in DE 10 2009 034 406 A1 is formed by an expandable cabin comprising a circumferential wall having an entrance wall section and a sanitary wall section.

BRIEF SUMMARY OF THE INVENTION

An aspect of the invention may provide an alternate, advantageous lavatory assembly, which allows a very space efficient construction, which may easily be customized without having to redesign the housing of the lavatory assembly and which is not limited to a compact urinal.

A modular lavatory assembly for a vehicle cabin is proposed, comprising a lavatory module having a housing and a toilet system having a toilet arranged in the inner space and at least one service unit having at least one service unit for personal use by a passenger. The housing encloses an inner space, which is free from additional service modules. The housing comprises at least one recess for accessing the at least one service unit of the at least one service module from inside the housing with the at least one service module being configured for providing access through the at least one recess. The at least one service module comprises at least one additional access for accessing the at least one service unit from outside the housing.

The lavatory module is to be understood as the main component of the lavatory assembly according to the invention, which provides the main toilet function. The lavatory module comprises a housing that provides a space, i.e. the inner space, having a certain privacy and separation from the cabin. In this regard, the housing is constituted by a set of walls, in particular lateral walls, a back wall, a floor section and a ceiling section. However, the number of walls may be altered and the walls may also partially be merged. Being free from additional service modules is to be understood as the lavatory module being only capable of providing the toilet function which leads to the ability to design the housing extremely compact and narrower to just meet the space requirements for the toilet. In this regard, a common toilet having a toilet seat may be installed. However, as an alternative, installing a urinal may be possible.

In a most simple embodiment, the housing has a rectangular base surface and substantially planar walls, which extend from the base surface vertically in an upward direction. The housing may in this case assume a block shape. However, in lateral cabin regions close to fuselage walls, the walls should be adapted to the shape of the adjacent aircraft structure, which in particular leads to a curved shape of at least one delimiting wall of the housing.

The actual measures of the housing are to be selected to the ergonomic requirements for using the toilet, which include a sufficient space for a passenger to at least turn around a vertical axis and to provide a sufficient shoulder- and head-space.

An aspect of the invention lies in the fact that service modules are attachable to desired individual fixed positions on an outer side of the housing, i.e. outer surfaces and in particular outer walls of the housing. This allows to plug self-contained service modules to the lavatory module, thereby allowing to simply customize the lavatory assembly based on individual requirements without having to completely redesign the housing of the lavatory module. Also, by placing the desired service modules in different positions, in particular in a vertical direction, the arrangement of service modules may be adapted for providing sufficient space for adjustable passenger seats directly adjacent to the lavatory assembly. The lavatory assembly is therefore highly modular and allows to quickly provide individual lavatory assemblies in a cost-effective manner.

In this regard it is particularly advantageous to install planar walls for building the housing of the lavatory assembly, which means that the walls are flat and substantially do not comprise bulges, indentations or kinks. From inside the housing, walls realized through this principle appear particularly continuous. Manufacturing planar walls allows to reduce manufacturing costs to a certain extent. Walls with a more complex shape would lead to clearly increased manufacture related costs.

The at least one service module preferably comprises a separate housing, which lets the service module act as an attachment part or, in other words, as an add-on component. Depending on the installation position, e.g. in a vertical direction, the extension of a service module does not need to be limited. The housing of a service module may comprise a dedicated attachment side, which comprises at least one cutout or which may simply be left open, such that an open shell results, wherein the open side will be covered by the wall, to which the service module will be attached.

Attaching the at least one service module may be achieved through a variety of different known attachment means, without limiting the invention to a certain attachment means. In case the lavatory module comprises a sandwich material for weight reduction, the attachment means may include integrated stiffening elements and/or load introduction means in the respective wall of the lavatory module, which spread over a certain region and/or are comprise a grid to allow a simple integration of individual service modules in desired positions.

Each service unit of a service module is made accessible through a recess, i.e. an opening or cut-out, such that a person inside the housing may reach through the opening into the particular service module, in which the desired service unit is present.

Concluding, the lavatory assembly according to an embodiment of the invention provides an extremely space efficient and easily customizable lavatory assembly, which is easy to manufacture and cost-effective. Furthermore, the design principle of externally attached service modules allows to easily provide advantageous retrofit solutions, which allow to modify or upgrade existing lavatory units to include additional or other functions. However it may also be possible to install a newly designed lavatory module, which comprises additional or other functions compared to a previously installed lavatory module, without having to change the overall dimensions of the base surface.

Preferably, for the purpose maintaining the function of each service unit, the at least one service module comprises at least one additional access for accessing the particular service unit from outside the housing. For example, such an access allows to empty or refill a particular bin or tank for providing fluids or paper and for removing waste.

In an advantageous embodiment the at least one service module is a waterless service module. As there is no service unit arranged in the inner space of the lavatory module there does not exist a washbasin, a tap and a drain inside the lavatory module. Furthermore, the service modules attached to the outside of the housing are waterless. The expression "waterless" stands for housing only waterless service units, which in particular provide especially cleaning functions without the requirement for water. This means that neither a washbasin nor other usually required devices for water based service units are installed, which allows the design of compact service modules as no dedicated water ducts are necessary.

In a further advantageous embodiment the inner space is free from a washbasin. As a washbasin usually requires a certain installation position in a vertical direction, as well as a certain extension on a horizontal plane for comfortably allowing to wash hands, a washbasin occupies a rather large area inside the lavatory module. Resultantly, eliminating a washbasin from a lavatory module allows to drastically reduce the extension of the lavatory on a horizontal plane. For example, the width of the lavatory module, i.e. the distance between two lateral walls of the lavatory module enclosing the toilet unit, may be reduced to a measure as small as 27 inches.

Still further, eliminating the washbasin also allows to drastically reduce the effort for installing water consuming devices inside the lavatory unit. Besides the elimination of suitable valves also no water or waste ducts are required, except for the ducts related to the toilet unit.

In a particularly advantageous embodiment at least one service module comprises a device of a group of service units, the group consisting of a dispenser for wet wipes, a dispenser for hygiene spray, hygiene foam, hygiene gel, cream and a disinfectant. Furthermore, the group may also include waste bin. Wet wipes and the hygiene spray may be used instead of water and soap, which clearly decreases the necessary weight for common installation equipment. If wet wipes are used, a washbasin, pipes, effluence, a water system in particular and fresh water may be eliminated without decreasing the comfort level for a passenger. Further, the elimination of water systems and the washbasin leads to a clearly slimmer housing of the lavatory module and a weight reduction in the range of more than 50 kg, which leads to a clearly reduced admission of $CO_2$ and a decreased fuel consumption. A hygiene spray dispenser may be used by a passenger for cleaning the hands, and/or for cleaning a toilet seat using toilet paper with sprayed on hygiene spray. Additionally, the service module may comprise a further service unit in form of a disinfectant spray dispenser. All dispensers may be realized with a mechanical or an electrical dispensing function.

A waste bin as one of the at least one service unit is particularly useful especially if at least one service unit is present that dispenses wet wipes, which have to be disposed of.

Furthermore, at least one of the at least one service module may comprise a stowage means for stowing objects. For example, emergency equipment may be stowed in one of the service modules.

Advantageously, at least one of the at least one service modules is positioned at a bottom edge of the housing and comprises a width that tapers off from a bottom end to a top end of the service module. This does not necessarily mean that the service module continuously tapers off in a monotonic manner. In particular it may be useful to provide a constant width at a bottom region, followed by a kink and a tapered surface, which may be wedge-like or rounded. For example, this particularly service module is arranged flush with the floor of the lavatory module and extends in a vertical direction along a wall of the lavatory module. Such a position is predestined for housing service units in the service module that may comprise a particularly large volume for receiving especially waste. In this regard the "widths" is considered the dimension of the service module, which is measured parallel to the width of the lavatory module. Hence, this particular service module attached to the lavatory module leads to a contour of the lavatory assembly which width tapers off at least from a certain position above the floor to a certain position above the floor. The position above the floor, from which the width tapers, may be chosen depending on a passenger seat positioned adjacent to the bottom service module. Usually, a passenger seat comprises a reclinable backrest, which defines a kink above a fixed seat region. The contour of the bottom service module and, consequently, of the lavatory arrangement, may be adapted to the vertical position of the passenger seat kink.

At the same time it may also be particularly useful to position at least one of the at least one service module at a top edge of the housing, the top service module comprising a width that tapers off from a top end to a bottom end of the top service module. In analogy to the previously mentioned bottom service module the top service module may be arranged flush to a top end of the lavatory module and extending along a side wall of the lavatory module in direction to the bottom/the floor. Hereby, the width also tapers off. This does not necessarily mean that the width continuously tapers off in a monotonic manner. However it may be particularly useful for providing a section having a constant width, which is running out in a tapered section following preferably underneath the section having a constant width. For example, the top service module may be used for dispensing wipes and for providing a hygiene spray etc.

At least two service modules may be arranged at a vertical distance to each other, such that a gap for receiving a reclined backrest of a passenger seat arranged adjacent to the lavatory module is created. This may be accomplished by a service module located at a bottom end of the side wall of the lavatory module ("doghouse") and a further service module arranged at the top of the side wall of the lavatory module ("bustle"). As the widths of the service modules preferably taper off to the top or the bottom of the lavatory module the reclined backrest of the adjacent passenger seat may snugly fit a bottom service module with a tapered of width and extend into the gap created between the service modules.

In the still further advantageous embodiment the at least one service module comprises a body and an insert, which is slidably supported in the body and is positionable in a use position and a maintenance position. The insert is fully inserted in the body and locked in the use position and the insert is pulled out of the body in the maintenance position. This allows an easy access to the service unit installed in the particular service module from an aisle of the cabin in order to not obstruct the lavatory module when the service units are maintained, e.g. refilled or emptied. It should be ensured that the insert always stays in the completely inserted use position through locking it appropriately. Still further, in the maintenance position it should be prevented for the insert to fall out from the body, such as through sufficient stop means.

In this regard is particularly advantageous if the use position and the maintenance position are distanced in a main extension direction of the lavatory module.

Advantageously the lavatory module comprises a main extension direction, along which an access opening and a toilet are arranged. The access opening is the opening of the lavatory module that allows a passenger to enter the lavatory module. Hence, the inserts of the service modules may be pulled out or inserted into the body in the same direction as the lavatory module is entered or left by a passenger.

Altogether, the housing may have a width in the range of approximately or slightly below 0.6 m, in particular 0.58 m, to approximately 0.7 m. In particular, the width lies in a range of 25 to 27 inches, which is clearly less than the width of a common lavatory unit in a vehicle, without sacrificing the free moving space. However, as a minimum width of 23 inches is conceivable.

Further, the invention relates to a cabin of a vehicle, comprising at least one floor, a plurality of passenger seats attached to the floor and at least one modular lavatory assembly according to the above description arranged on the floor adjacent to at least one of the plurality of passenger seats. Still further, the invention relates to an aircraft having a cabin and at least one such modular lavatory assembly.

BRIEF DESCRIPTION OF THE DRAWINGS

Other characteristics, advantages and potential applications of the present invention result from the following description of the exemplary embodiments illustrated in the figures. In this respect, all described and/or graphically illustrated characteristics also form the object of the invention individually and in arbitrary combination regardless of their composition in the individual claims or their references to other claims. Furthermore, identical or similar objects are identified by the same reference symbols in the figures.

DETAILED DESCRIPTION

Figure 1:
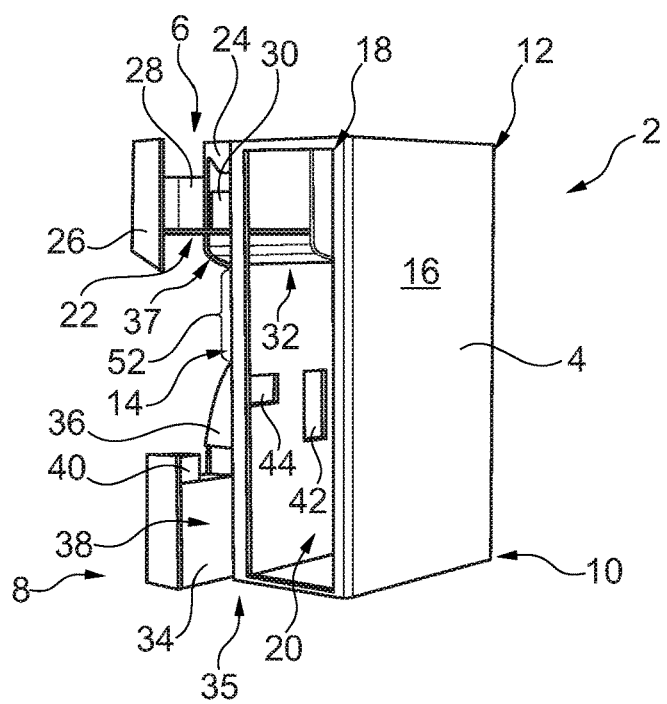
FIGS. 1, 2a and 2b show a modular lavatory assembly in an isometric view from two different directions.

FIG. 1 shows a lavatory assembly 2 having a lavatory module 4 and two service modules 6 ("bustle") and 8 ("doghouse") attached to the lavatory module 4. The lavatory module 4 comprises a bottom end 10 and a top end 12 as well as a first lateral side wall 14 and a second lateral side wall 16, between which an access opening 18 is enclosed. By passing the access opening 18, an inner space 20 of the lavatory module 4 may be reached.

The lateral side walls 14 and 16 may be constructed from a lightweight sandwich material having at least one core layer enclosed by outer cover layers. One or both of the lateral side walls 14 and 16 may be adapted for carrying individual service modules 6 and 8, in particular through adapting the design of the particular wall to be able to carry additional weight and to compensate additional mass forces arising from the service modules 6 and 8 during the operation of the vehicle. In the following, the left lateral side wall 14 is adapted for carrying the service modules 6 and 8. However, it may be possible to also manufacture a lavatory assembly that is capable of carrying the service modules 6 and 8 on the other lateral side wall 16 or at both side walls 14 and 16.

The service module 6 is arranged exemplarily flush with the top end 12 and comprises an insert 22, which is slidably supported in a body 24 and furthermore comprises an end plate 26 for covering the opening of the body 24 when the insert 22 is fully inserted. By completely sliding the insert 22 into body 24 in a drawer-like manner, exemplarily and without limitation, two service units 28, 30 in form of a hygiene spray dispenser 28 and a wet wipes dispenser 30 are accessible through a cutout 32 in the first lateral sidewall 14 from inside the lavatory module 4. It goes without saying that insert 22 is lockable in a use position, which is with fully inserted insert 22 for preventing inadvertent sliding out of the insert 22. This design leads to an access 37, through which the service units 28 and 30 are accessible from outside the lavatory module 4.

In analogy, service module 8 is arranged flush with the bottom end 10 of the lavatory module 4 and comprises an insert 34, which is insertable into a body 36 in a drawer-like manner. Exemplarily, service module 8 comprises a service unit 38 in form of a waste bin 38. Further, emergency equipment 40 is stowed inside the service module 8. The waste bin 38 is accessible through an openings 44 in the first sidewall 14 from inside the lavatory module 4. A further opening 42 is present for carrying a toilet paper holder. The emergency equipment 40 is preferably only accessible through sliding out the insert 34. As before, this design leads to an access 35, through which the service units 28 and 30 are accessible from outside the lavatory module 4.

Figure 2A:
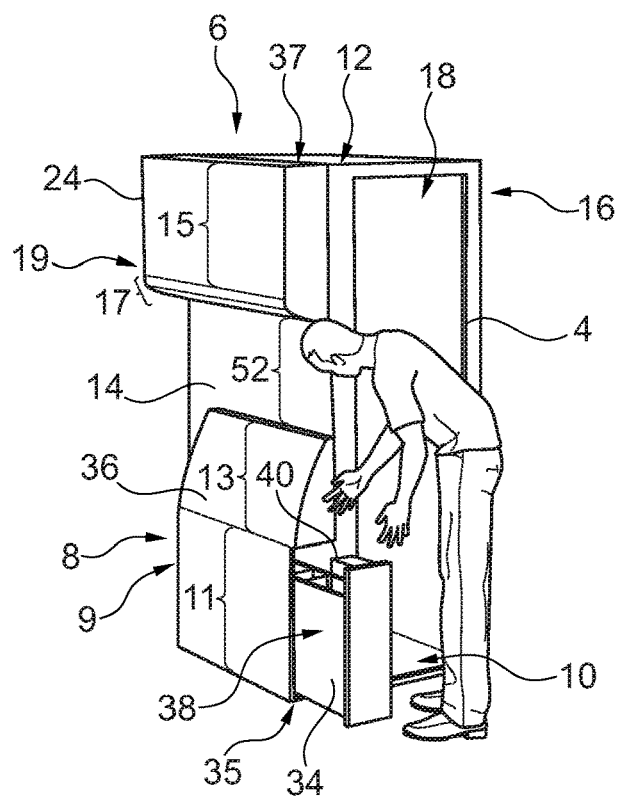
Figure 2B:
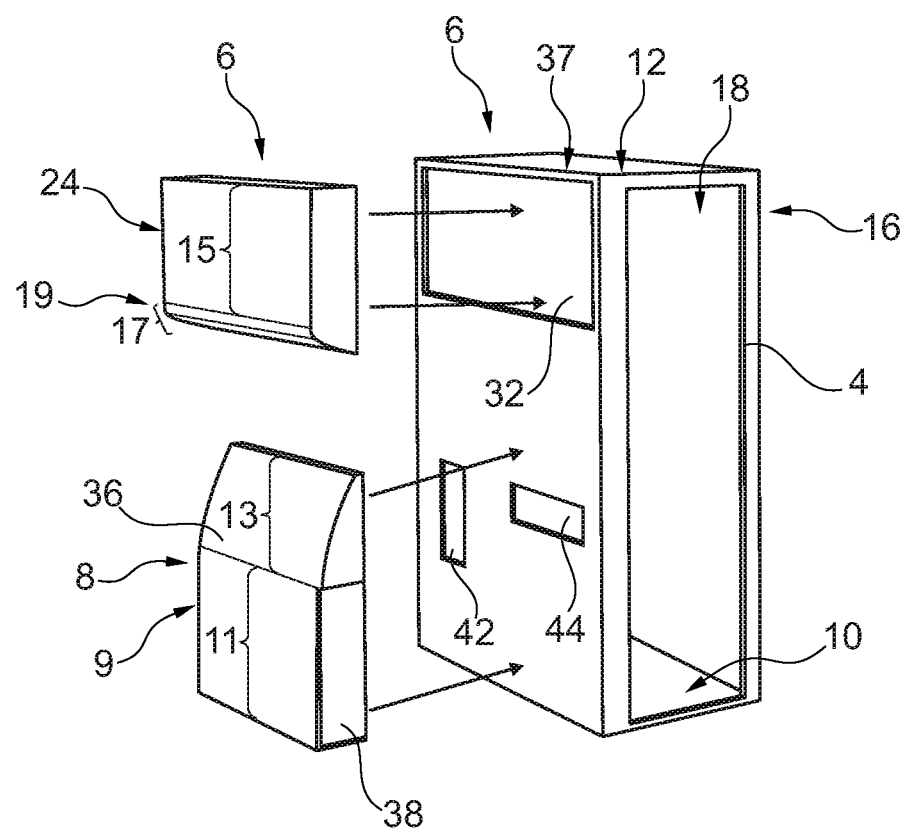

As nicely shown in FIGS. 2a and 2b, both service modules 6 and 8 comprise a width that tapers off. The bottom service module 8 has a width that is constant in a bottom region up to an upper limit 9 of a bottom region 11 and tapers off in a top region 13 in direction to the top end 12 of the lavatory module 4. The height of the bottom region 11 may exemplarily be about 40 to 50 cm, depending on the kink point of a passenger seat.

The top service module 6 comprises a width that is constant in a top region 15 and tapers off in direction of the bottom end 10 of the lavatory module 4 in a bottom region 17 of the top service module 6, below a lower limit 19 of the top region 15. The height of the top region may exemplarily be about 40 to 50 cm, depending on the desired size of a gap 52 between the top service module 6 and the bottom service module 8, which may comprise a height of exemplarily 40 to 50 cm, too. The width of both service modules 6 and 8 may be dimensioned according to the requirements of the aircraft operator, for example in a range of 15 to 25 cm.

Furthermore, it is nicely shown in FIGS. 2a and 2b that the inserts 22 and 34 are accessible from outside the lavatory module 4 for maintenance, such as emptying of the waste bin or refilling fluids etc. As illustrated particularly in FIG. 2b, both service modules 6 and 8 are separate components, which are attached to the planarly designed first lateral sidewall 14. Preferably, the service modules 6 and 8 are open shells, while the first lateral sidewall 14 comprises correspondingly positioned cutouts 32, 42 and 44.

Figure 3:
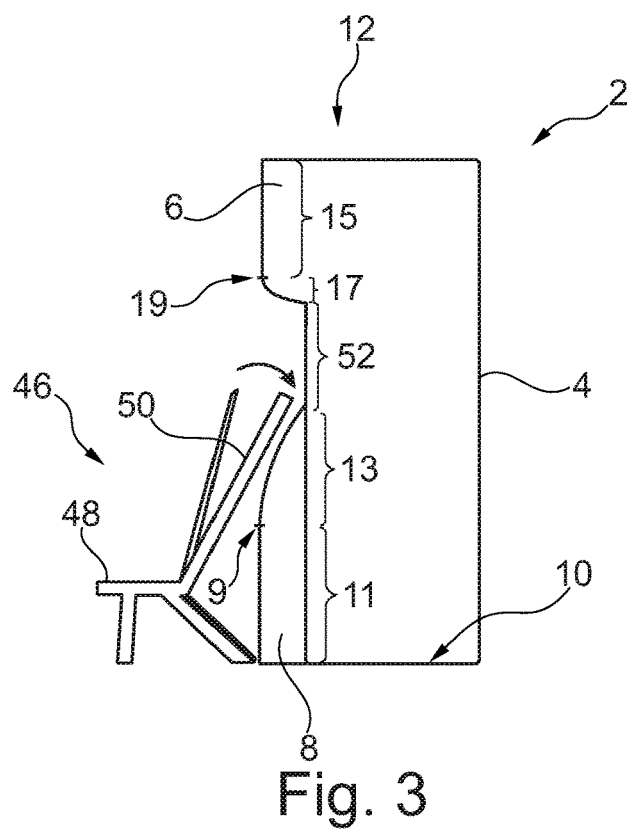
FIG. 3 shows the modular lavatory assembly in a front view with an adjacent passenger seat.

FIG. 3 shows a lavatory assembly 2 adjacent to a passenger seat 46, which has a seating surface 48 and a reclineable backrest 50. The lavatory assembly 2 has a gap 52 between the top service unit 6 and the bottom service unit 8, which allows the reclineable backrest 50 to reach the gap 52, while maintaining a safety distance of exemplarily 1 inch. The gap 52 is sufficiently large to allow a head of the passenger to be positioned underneath the service module 6 without limiting the passenger comfort. This allows the passenger seat 46 to be closely placed to the lavatory assembly 2, which allows, in combination with the extremely narrow lavatory module 4, a clear increase in the space efficiency of the cabin.

Figure 4:
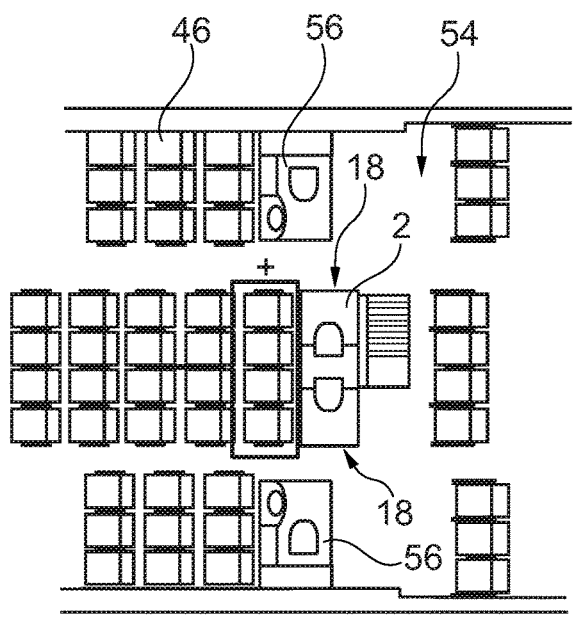
FIG. 4 shows a section of a cabin setup having conventional lavatories and modular lavatory assemblies.

FIG. 4 furthermore shows a cabin 54 having a plurality of passenger seats 46 and exemplarily two modular lavatory assemblies 2 arranged back to back in a center region of the cabin 54. Further, two common lavatory units 56 having water based service units are placed in lateral sections of the cabin 54 as an example. As clearly visible from this drawing a further row of passenger seats 46 may be integratable into the cabin 54 through the advantageous design of the lavatory assemblies 2 according to the invention.

Figure 5:
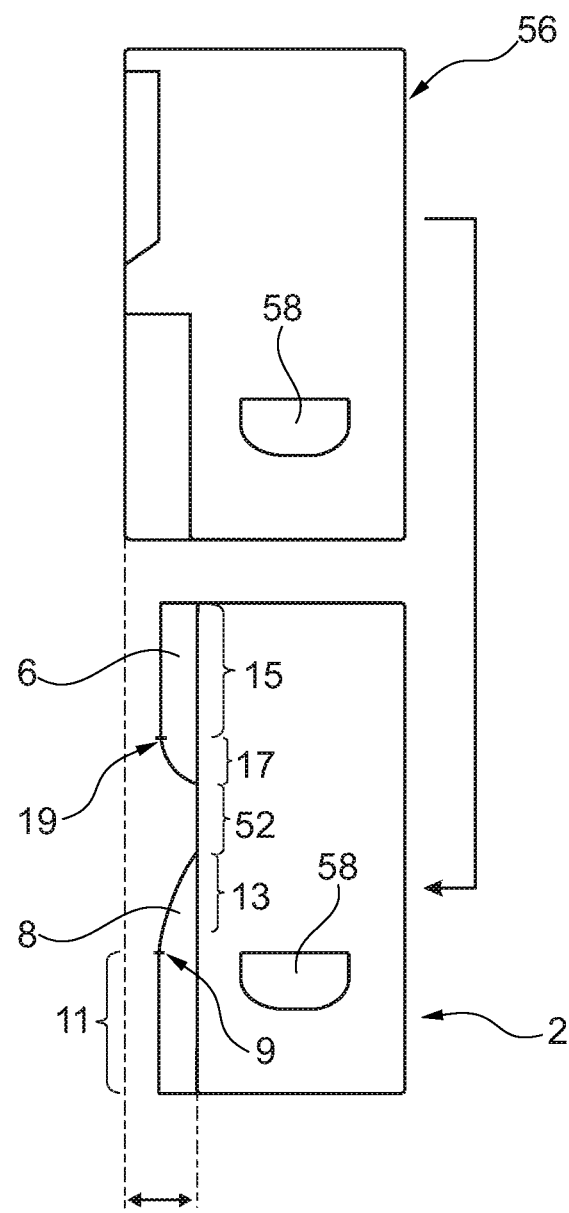
FIG. 5 shows an exemplary width comparison of a conventional lavatory and a modular lavatory assembly.

The increase in available installation space in the cabin is further demonstrated in FIG. 5 which shows the outlines of a common lavatory unit 56 in comparison to a lavatory assembly 2 according to the invention. The lavatory assembly 2 according to the invention is clearly narrower, exemplarily about 10 inches, than a common lavatory unit 56. By comparing the available space lateral to a toilet 58 it is apparent that the comfort of a passenger's movability is clearly maintained.

As a supplement, it should be noted that "comprising" does not exclude any other elements or steps, and that "a" or "an" does not exclude a plurality. It should furthermore be noted that characteristics described with reference to one of the above exemplary embodiments can also be used in combination with other characteristics of other above-described exemplary embodiments. Reference symbols in the claims should not be interpreted in a restrictive sense.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A modular lavatory assembly for a vehicle cabin, comprising:
    a lavatory module having a housing having a lateral wall;
    a toilet system having a toilet arranged in an inner space of the lavatory module; and
    at least one service module having at least one service unit for personal use by a passenger and configured to be carried by the lateral wall,
    wherein the at least one service module is attached to an outside of the housing along the lateral wall, wherein the housing encloses the inner space free from additional service modules,
    wherein a first one of the at least one service module is positioned at a bottom edge of the lateral wall and comprises a width that tapers off from a bottom end to a top end of the first one of the at least one service module,
    wherein a second one of the at least one service module is positioned at a top edge of the lateral wall and comprises a width that tapers off from a top end to a bottom end of the second one of the at least one service module,
    wherein the lateral wall comprises at least a first recess and a second recess for accessing a first one and a second one of the at least one service unit of the first one and second one of the at least one service module, respectively, from an inside of the housing.

2. The modular lavatory assembly of claim 1, wherein the at least one service module is waterless.

3. The modular lavatory assembly of claim 1, wherein the inner space is free from a washbasin.

4. The modular lavatory assembly of claim 1, wherein the at least one service module comprises a service unit of a group of service units, the group consisting of
    a dispenser for wet wipes,
    a dispenser for a hygiene spray,
    a dispenser for a hygiene foam,
    a dispenser for hygiene gel,
    a dispenser for disinfectant,
    a dispenser for cream, and
    a waste bin.

5. The modular lavatory assembly of claim 1, wherein the first one and second one of the at least one service modules are arranged at a vertical distance to each other, such that a gap for receiving a reclined backrest of a passenger seat arranged adjacent to the lavatory module is created.

6. The modular lavatory assembly of claim 1, wherein at least one of the first one and second one of the at least one service module comprises a body and an insert slidably supported in the body and positionable in a use position and a maintenance position,
    wherein the insert is fully inserted in the body and locked in the use position, and
    wherein the insert is pulled out of the body in the maintenance position.

7. The modular lavatory assembly of claim 6, wherein the use position and the maintenance position are distanced in a main extension direction of the lavatory module.

8. The modular lavatory assembly of claim 1, wherein the lavatory module comprises a main extension direction, along which an access opening and a toilet are arranged.

9. The modular lavatory assembly of claim 1, wherein the housing has a width in the range of 0.58 to 0.7 m.

10. A cabin of a vehicle, comprising:
at least one floor;
a plurality of passenger seats attached to the floor;
at least one modular lavatory assembly arranged on the floor adjacent to at least one of the plurality of passenger seats, the at least one module lavatory assembly comprising:
 a lavatory module having a housing;
 a toilet system having a toilet arranged in an inner space of the lavatory module; and
 at least one service module having at least one service unit for personal use by a passenger,
 wherein the at least one service module is attached to an outside of the housing,
 wherein the housing encloses the inner space free from additional service modules, and
 wherein the housing comprises at least one recess for accessing the at least one service unit of the at least one service module from an inside of the housing with the at least one service module being configured for providing access through the at least one recess, and
 wherein the at least one service module comprises at least two service modules arranged at a vertical distance to each other, creating a gap therebetween, such that in one operational mode, a reclined backrest of one of the plurality of passenger seats is received in the gap.

11. An aircraft having a cabin according to claim 10.

* * * * *